United States Patent [19]
Uchida

[11] Patent Number: 5,929,904
[45] Date of Patent: *Jul. 27, 1999

[54] CONTROL OF CAMERA SENSING DIRECTION IN A VIEWABLE RANGE DEFINED BY CAMERA PANNING AND TILTING

[75] Inventor: Atsuo Uchida, Yokohama, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/626,694

[22] Filed: Apr. 2, 1996

[30] Foreign Application Priority Data

Apr. 7, 1995 [JP] Japan .................................. 7-082876

[51] Int. Cl.⁶ .................................................. H04N 5/232
[52] U.S. Cl. ........................................... 348/211; 348/143
[58] Field of Search ..................................... 348/207, 211, 348/212, 213, 143, 169, 36, 37, 38, 39, 152, 153, 154, 155, 159, 333, 334; H04N 5/225

[56] References Cited

U.S. PATENT DOCUMENTS

| | | | |
|---|---|---|---|
| 5,218,627 | 6/1993 | Corey et al. ............................. | 348/211 |
| 5,396,287 | 3/1995 | Cho . | |
| 5,479,206 | 12/1995 | Ueno et al. .............................. | 348/143 |
| 5,568,183 | 10/1996 | Cortjens et al. ........................ | 348/211 |
| 5,570,177 | 10/1996 | Parker et al. ............................ | 348/211 |

FOREIGN PATENT DOCUMENTS

| | | |
|---|---|---|
| 0 644 694 A1 | 3/1995 | European Pat. Off. . |
| 2 693 868 | 1/1994 | France . |
| 59-110283 | 6/1984 | Japan . |
| 59-110284 | 6/1984 | Japan . |
| 4-157882 | 5/1992 | Japan . |
| 4-196774 | 7/1992 | Japan . |
| 5-276510 | 10/1993 | Japan . |
| WO 93/06690 | 4/1993 | WIPO . |

OTHER PUBLICATIONS

IBM Technical Disclosure Bulletin, vol. 37, No. 04B, Apr. 1994, pp. 539–540, "Direct Control of A Video Camera on A Video Monitoring Screen".

IBM Technical Disclosure Bulletin, vol. 35, No. 5, Oct. 1992, pp. 403–404, "Computerizing Video Surveillance Techniques".

*Primary Examiner*—Tuan V. Ho
*Attorney, Agent, or Firm*—Morgan & Finnegan, L.L.P.

[57] ABSTRACT

A camera control apparatus of this embodiment has the following arrangement. Pan buttons (42, 44), tilt buttons (46, 48), a home position button (50), a telephoto button (52), and a wide-angle button (54) are set on a camera operation window (40). A rectangular frame (56) indicates the maximum image sensable range based on pan, tilt, and zoom operations. An image sensable range based on the current pan, tilt, and zoom values is displayed as a rectangular frame (or rectangular box) having a size corresponding to the zoom value at a position corresponding to the pan and tilt angles within the rectangular frame (56). Desired image sensing directions and the like are registered at preset memory buttons (60) (60-1–60-6). A register button (62) for registration of such data and a delete button (64) for deleting the registered data are also set on the camera operation window. Symbols (66, 68, 70) encircling registered buttons (60) are displayed at positions corresponding to the registered image sensing directions within the rectangular frame (56).

22 Claims, 6 Drawing Sheets

FIG. 4

| ID NAME | PRESET NUMBER | ITEM | DATA |
|---|---|---|---|
| CAMERA 1 | 1 | PAN ANGLE | +45 |
| | | TILT ANGLE | +10 |
| | | ZOOM VALUE | 30 |
| | 2 | PAN ANGLE | +45 |
| | | TILT ANGLE | -35 |
| | | ZOOM VALUE | 60 |
| | 3 | PAN ANGLE | — |
| | | TILT ANGLE | — |
| | | ZOOM VALUE | — |
| | 4 | PAN ANGLE | — |
| | | TILT ANGLE | — |
| | | ZOOM VALUE | — |
| | 5 | PAN ANGLE | -30 |
| | | TILT ANGLE | -55 |
| | | ZOOM VALUE | 10 |
| | 6 | PAN ANGLE | — |
| | | TILT ANGLE | — |
| | | ZOOM VALUE | — |
| | 7 | PAN ANGLE | -25 |
| | | TILT ANGLE | 15 |
| | | ZOOM VALUE | 75 |

CONTROL OF CAMERA SENSING DIRECTION IN A VIEWABLE RANGE DEFINED BY CAMERA PANNING AND TILTING

BACKGROUND OF THE INVENTION

1. Field of the Invention

The present invention relates to a camera control method and apparatus and, more particularly, to a camera control method and apparatus for remotely controlling a camera whose image sensing direction (e.g., pan and tilt directions) and image sensing magnification can be externally controlled.

2. Description of the Related Art

Video cameras whose pan, tilt, and zoom operations can be remotely controlled are widely used for TV conference systems. An interface like the one shown in FIG. 1 is known as a conventional user interface on the screen of a computer for controlling such a video camera. Reference numeral 110 denotes the monitor screen of a computer for controlling a video camera connected thereto. The monitor screen 110 displays an image display window 112 for displaying an image input by the video camera, and a camera operation window 114 used to operate the video camera. The camera operation window 114 includes buttons 116 and 118 for operations in the pan direction, buttons 120 and 122 for operations in the tilt direction, a button 124 for operations in the telephoto direction, and a button 126 for operations in the wide-angle direction. Windows 128 and 130 for other types of application software may also be opened on the monitor screen 110.

An operator can remotely control the image sensing direction and image sensing magnification of the connected video camera by operating the buttons 116 to 126 on the camera operation window 114 with a pointing device such as a mouse.

With such a user interface for camera control, however, in order to change the image sensing direction and image sensing magnification to a desired direction and magnification, the operator must continuously execute several operations, which is cumbersome for the operator. For example, in order to enlarge an upper right portion of an image displayed on the image display window 112 as compared with its central portion, the operator must sequentially and repeatedly operate the right pan button 118, the upward tilt button 120, and the telephoto button 124 until a desired state is set.

SUMMARY OF THE INVENTION

Accordingly, an objective of the present invention is to obtain a camera control apparatus which can solve the above problem and control a camera to a desired image sensing state with a small operation amount.

The foregoing object is attained by providing a camera control apparatus comprising: first display means for displaying an image sensable range of a camera on image display means; storage means for storing image sensing direction data of said camera; and second display means for displaying identification data used to identify the image sensing direction data of said camera at a position corresponding to the image sensing direction data of said camera, which is stored in said storage means, within the image sensable range displayed by said first display means.

Further, the foregoing object is attained by providing a camera control method comprising: first display step of displaying an image sensable range of a camera on image display means; storage step of storing image sensing direction data of said camera; and second display step of displaying identification data used to identify the image sensing direction data of said camera at a position corresponding to the image sensing direction data of said camera, which is stored at said storage step, within the image sensable range displayed at said first display step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiment of the invention and, together with the description, serve to explain the principles of the invention.

FIG. 4 is a view showing preset items associated with a camera state and their contents in the embodiment;

DETAILED DESCRIPTION OF THE PREFERRED EMBODIMENT

Preferred embodiments of the present invention will be described in detail in accordance with accompanying drawings.

Figure 1:
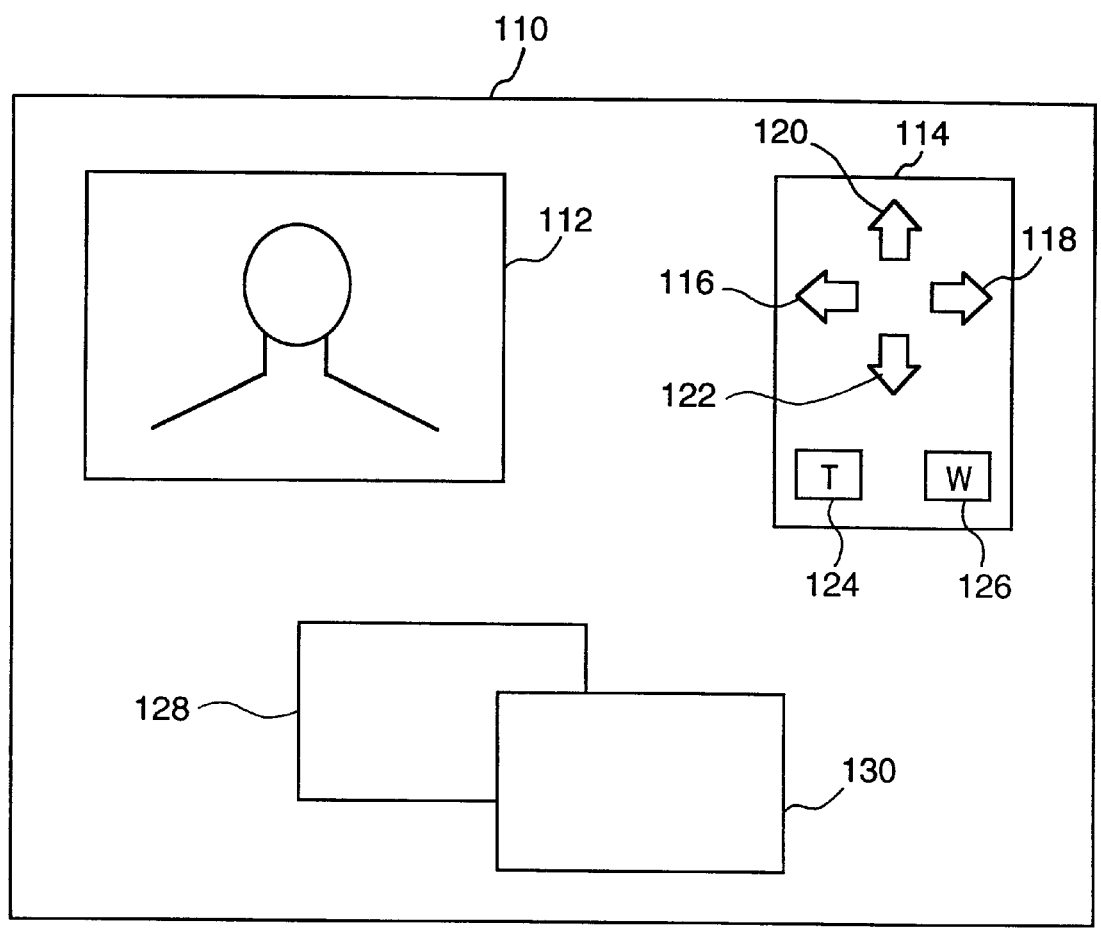
FIG. 1 is a view showing a conventional user interface.
Figure 2:
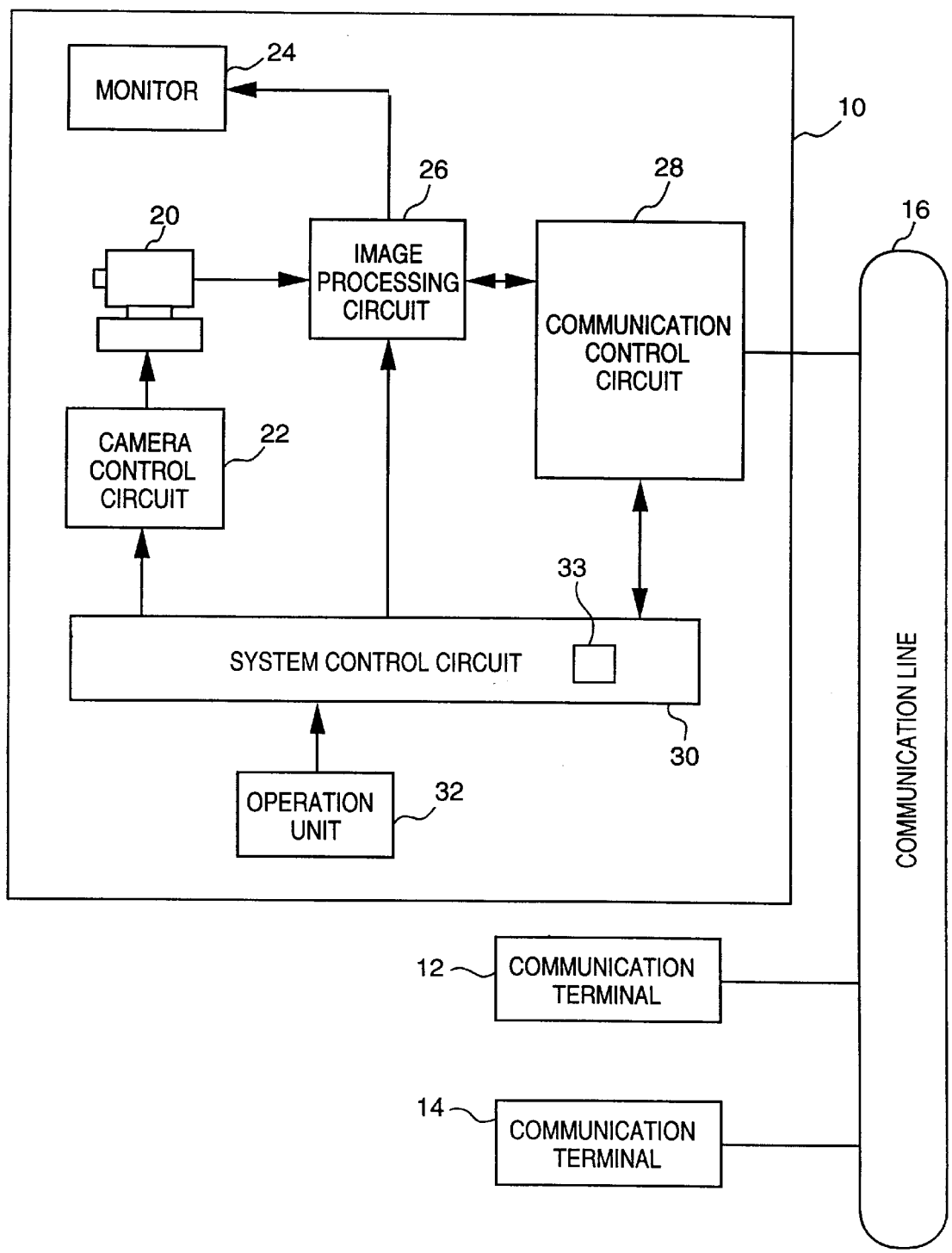
FIG. 2 is a block diagram showing the schematic arrangement of an embodiment of the present invention.

FIG. 2 is a block diagram showing the schematic arrangement of a TV conference system or video conference system according to an embodiment of the present invention. Image communication terminals 10, 12, and 14 are connected to each other via a communication line 16 constituted by a public analog telephone line, an ISDN line, or a LAN so that the terminals can communicate image data with each other and allow remote control of video cameras. Since the terminals 10, 12, and 14 have the same basic internal arrangement, the block diagram of FIG. 2 shows the internal arrangement of only the terminal 10.

The internal arrangement of the terminal 10 will be described below. Reference numeral 20 denotes a video camera having a zoom lens and mounted on a panhead having pan and tilt functions. The video camera 20 can be panned and tilted at desired angles, and its image sensing magnification can be changed to a desired zoom value, in response to drive signals from a camera control circuit 22. Reference numeral 24 denotes a display monitor; 26, an image processing circuit for coding a video signal output from the video camera 20 into information for transmission, and decoding received coded image information to supply the decoded information to the display monitor 24; 28, a communication control circuit for controlling communication with other terminals 12 and 14 via the communication line 16; 30, a system control circuit for controlling the overall system; and 32, an operation unit such as a keyboard or mouse with which a user inputs various commands to the system control circuit 30.

The system control circuit 30 can be constituted by a CPU (microprocessor), a program sequencer, a sequential circuit, and the like. The system control circuit 30 performs operations by reading out various control programs stored in an internal memory 33, and interpreting and executing the programs. A work area required for the operations is assigned to the memory 33.

In this embodiment, similar to a general TV conference system, the image sensing direction and image sensing magnification of the video camera 20 of the terminal 10 can be basically set by remote control by supplying commands from the other terminals 12 and 14 via the communication line 16, as well as by using the operation unit 32 of the terminal 10. Similarly, the cameras of the terminals 12 and 14 can be remotely controlled from other terminals. An image input by the camera 20 of the terminal 10 is transmitted to the terminals 12 and 14 via the communication line 16 to be displayed on the respective monitors. Similarly, an input image from the terminal 12 is transmitted to the terminals 10 and 14, and an input image from the terminal 14 is transmitted to the terminals 10 and 12.

Figure 3:
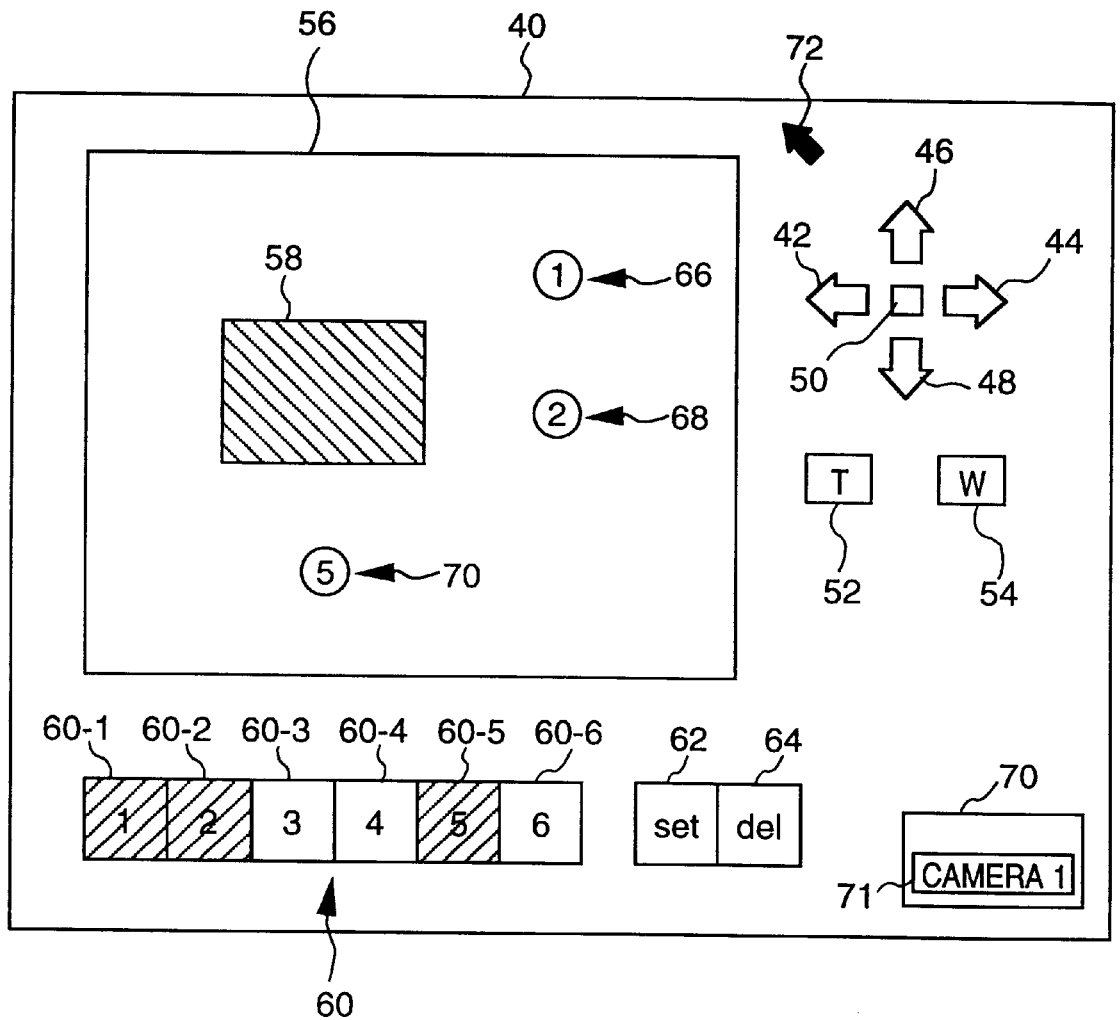
FIG. 3 is a view showing a camera operation window in the embodiment.

The monitor 24 displays an image display window for displaying an image from a video camera to be operated, and a camera operation window for a camera operation. FIG. 3 shows a camera operation window in this embodiment. The following buttons are set on a camera operation window 40: a left pan button 42 for a pan operation to the left, a right pan button 44 for a pan operation to the right, an upward tilt button 46 for an upward tiling operation, a downward tilt button 48 for a downward tilt operation, a home position button 50 for returning to a position in front of the camera, a telephoto button 52 for changing the image sensing magnification in the telephoto direction, and a wide-angle button 54 for changing the image sensing magnification in the wide-angle direction.

These buttons 42 to 54 are known elements. This embodiment further includes the following elements. A rectangular frame 56 indicating the maximum image sensable range based on pan, tilt, and zoom operations is set on the camera operation window. In the rectangular frame 56, an image sensable range based on the current pan and tilt angles and the current zoom value is displayed as a rectangular frame (or rectangular box) 58 of a size corresponding to the zoom value at a position corresponding to the pan and tilt angles. The camera operation window also includes six preset memory buttons 60 (60-1 to 60-6) for registering various camera states (e.g., a image sensing direction, a image sensing magnification, counterlight correction data, and a shutter speed) in the memory 33 in the system control circuit 30, a register button 62 for setting the registration mode, and a delete button 64 for deleting registered data.

When, for example, camera state data is to be registered (this operation will be described in detail later), the user depresses the register button 62 first, and then depresses one of the preset memory buttons 60 which corresponds to a number at which the data is to be registered, e.g., the button 60-1. As a result, the camera state data at the time the register button 62 is depressed is registered in a partial area of the memory 33 which corresponds to the depressed button 60-1 of the preset memory buttons 60. When the user depresses the preset memory button 60-1 afterward, the system control circuit 30 controls the video camera 20 to a camera state indicated by the camera state data, registered with the preset memory button 60-1, through the camera control circuit 22. When registered data is to be deleted, the user depresses the delete button 64 first, and then depresses one of the preset memory buttons 60 which corresponds to a number at which the data is to be deleted. With this operation, the system control circuit 30 deletes the contents registered in a partial area of the memory 33 which corresponds to the preset memory button 60-2.

The preset memory buttons 60 are displayed in different display states (e.g., different colors or lightnesses) depending on whether data are registered. With this display, the user can quickly know which preset memory buttons 60 have been registered. For example, in the case shown in FIG. 3, the buttons 60-1, 60-2, and 60-5, the hatched portions, have already been registered, but the remaining buttons 60-3, 60-4, and 60-5 have not been registered. When camera state data, e.g., a image sensing direction, is registered, the button number at which the data is registered is displayed at a position in the rectangular frame 56 which corresponds to the image sensing direction of various camera state data. Referring to FIG. 3, reference symbols 66, 68, and 70 denote symbols which display that the buttons 60-1, 60-2, and 60-5 are registered, and are displayed at positions in the rectangular frame 56 which correspond to pan and tilt angles which are registered at the buttons 60-1, 60-2, and 60-5. In order to allow the user to know zoom values registered at the buttons 60-1, 60-2, and 60-5 at the same time, for example, rectangular frames having sizes corresponding to the registered zoom values may be displayed and superposed on the symbols 66, 68, and 70. The buttons 60-1 to 60-6 may be discriminated with different colors, and the symbols 66, 68, and 70 (and rectangular frames or boxes corresponding to the zoom values) are displayed in the same colors as those of the buttons 60-1 to 60-6. In this case as well, whether registration has been made can be discriminated with different lightnesses.

Camera information registered in the memory 33 with the preset memory buttons 60 and the format of the stored information will be described with reference to FIG. 4. As indicated by the table in FIG. 4, the camera information is constituted by an ID name, preset numbers, i.e., the button numbers of the preset memory buttons 60, pan and tilt angles representing image sensing directions corresponding to the respective preset numbers, and zoom values representing image sensing magnifications. The area of preset number 7 is prepared to store the current camera state data, and can be used to restore to the immediately preceding camera state when an unintentional operation is performed. Referring to FIG. 4, the pan and tilt angles are relative values when the pan/tilt range is set to be −100 to +100, and the zoom values are relative values when the telephoto and wide-angle ends are set to 0 and 100, respectively. As is apparent, these values may be moving amounts from a reference position or the numbers of motor driving pulses.

If memory areas each similar to the one shown in FIG. 4 are prepared for a plurality of cameras, a plurality of camera states can be preset in a plurality of cameras, e.g., cameras at remote places. In this case, a button for selecting a camera to be operated is set on the camera operation window 40 in FIG. 3.

The selection button 70 is an example of this button for selecting a camera to be operated. Reference numeral 71 denotes the ID name of a target camera currently displayed on the camera operation window 40.

The system control circuit 30 selects the video camera of an image communication terminal connected to the communication line 16 every time the operation button 70 is selected by an operation unit, and displays the ID name of the camera. Assume that the ID name of each camera is stored in the memory 33.

The system control circuit 30 picks up a camera ID stored in the memory 33 every time the selection button 70 is selected, and displays it as the ID name 71.

In this embodiment, the registered information set at each of the preset memory buttons 60 is stored in the memory 33 of the terminal which is actually operated by the user. However, the information may be stored in the memory of a terminal to which a video camera to be controlled is connected. In the former case, each operator can arbitrarily set the camera state of a camera to be operated. In the latter case, by setting user ID names specifying users who operate cameras, instead of camera ID names, each user can register a plurality of camera states. As is apparent, if no camera ID names are set, a plurality of users commonly use registered camera states. If only a manager is allowed to change the registered contents, an image input display system can be provided, in which a switching operation can be easily performed to allow a user to see a desired image for building guidance or the like.

A procedure for selecting each button by using each button image and a mouse cursor displayed on the monitor 24 and the operation unit 32 such as a pointing device will be briefly described next. Since this processing method is known, only essential part of the procedure will be described below.

First of all, the system control circuit 30 displays button images like those in shown in FIG. 3 and a mouse cursor 72. The memory 33 stores the display position data of each button image. The user then operates the pointing device (operation unit 32) to move the mouse cursor 72 to a target button. The system control circuit 30 receives this operation amount, and calculates a moving direction and amount with respect to the current display position of the mouse cursor on the basis of the operation amount, thereby moving the mouse cursor. When the user clicks the pointing device (operation unit 32), the system control circuit 30 receives click data corresponding to this clicking operation, and searches the current mouse cursor position and the display position data of each button image stored in the memory 33, thereby selecting a button image at the display position where the click data coincides with the display position data. Subsequently, various types of processing are performed on the basis of such selecting operations.

In the following description, the above description of the process of selecting each button will be omitted, and selection processing for each button will be simply described like "selection of an x button".

A procedure for registering/deleting each camera state data in this embodiment will be described next with reference to FIG. 5.

In step S12, the system control circuit 30 checks whether one of the operation buttons 42, 44, 46, 48, 52, and 54 in FIG. 3, i.e., one of the buttons for correcting the image sensing direction and image sensing magnification of the camera 24, is selected. If NO in step S12, the flow advances to step S15. If YES in step S12, the flow advances to step S13.

Note that the above camera 24 may be the camera of the terminal 12 or 14.

Figure 6:
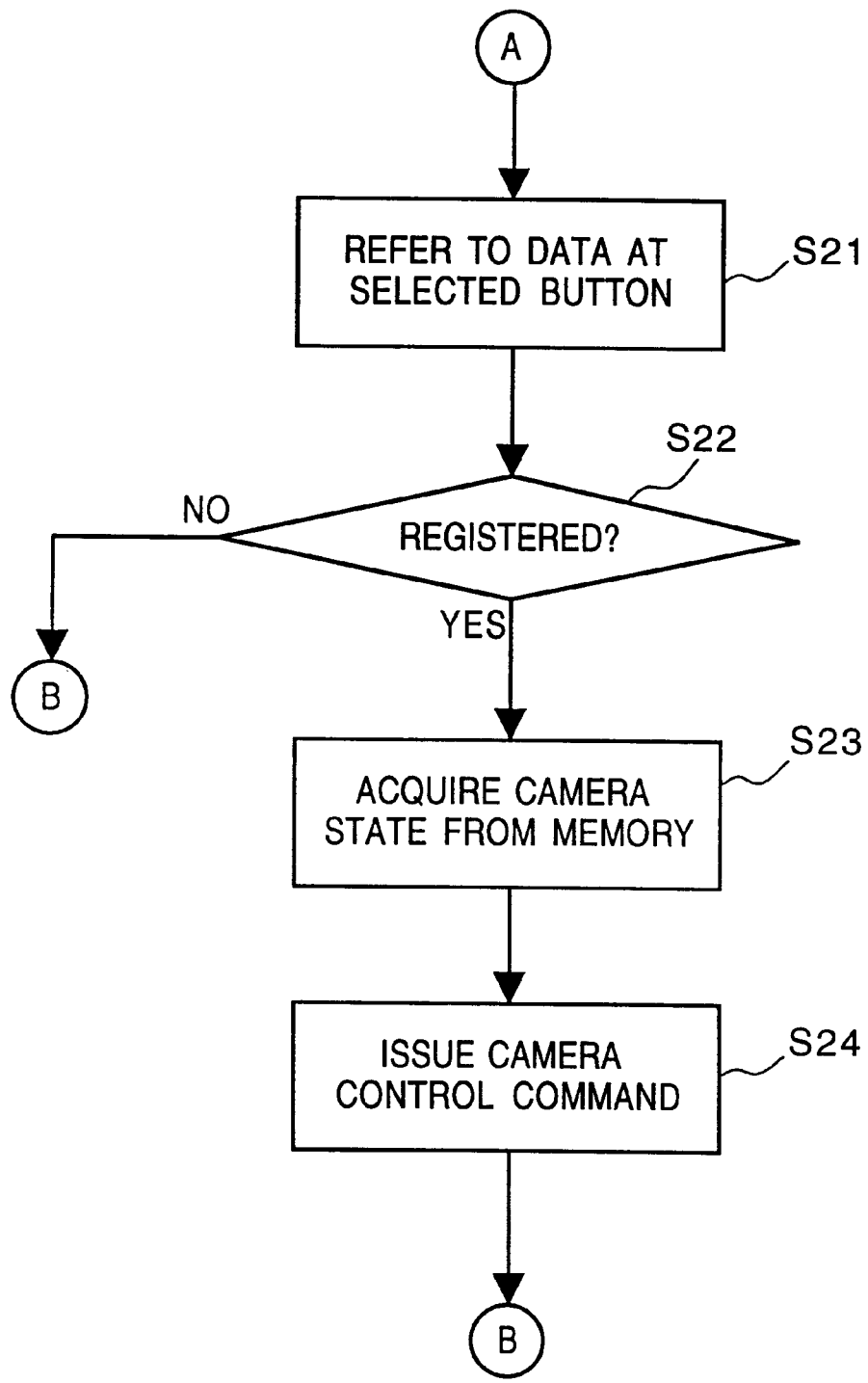
FIG. 6 is a flow chart showing a camera operation performed with the preset memory buttons 60.

In step S15, the system control circuit 30 checks whether one of the preset memory buttons 60 is clicked. If YES in step S15, the flow advances to step S21 (FIG. 6). If NO in step S15, the flow advances to step S1.

In step S13, the data at preset number 7 in FIG. 4, i.e., the current image sensing direction and image sensing magnification of the camera, are corrected in accordance with the selected operation buttons. The corrected image sensing direction and image sensing magnification are stored in a partial area of the memory 33.

As is apparent, the image sensing direction is expressed by pan and tilt angle data, and the image sensing magnification is expressed by a zoom value.

In step S14, the rectangular frame 58 is corrected on the basis of the image sensing direction and image sensing magnification corrected in step S13. The flow advances to step S1.

In step S1, the system control circuit 30 checks whether the user selects the register button 62. Note that the user selects the register button 62 to register the current camera state. If YES in step S1, the flow advances to step S2. If NO in step S1, the flow advances to step S7.

In step S2, the flow waits until one of the preset memory buttons 60 is selected. When a button is selected, the flow advances to step S3. The user selects one of the preset memory buttons 60 as a button at which the current camera state is registered.

In step S3, the system control circuit 30 checks whether any camera state data has already been registered at the button selected in step S2. If YES in step S3, the flow returns to step S12 to repeat the above processing. If NO in step S3, the flow advances to step S4.

In step S4, the system control circuit 30 reads out the image sensing direction (pan and tilt angles) and the image sensing magnification (zoom value) stored in step S13.

In step S5, the system control circuit 30 stores the readout image sensing direction (pan and tilt angles) and image sensing magnification (zoom value) in a memory area (33) (see FIG. 4) corresponding to the selected button.

In step S6, the selected button number (a preset number in FIG. 4) is displayed at a position in the maximum image sensable range 56 corresponding to the image sensing direction registered at the button, together with a symbol. The symbols 66, 68, and 70 in FIG. 3 are display samples. The flow then returns to step S12.

In step S7, the system control circuit 30 checks whether the delete button 64 is selected. If YES in step S7, the flow advances to step S8. If NO in step S7, the flow returns to step S12.

In step S8, the flow waits until one of the preset memory buttons 60 is selected. If a button is selected, the flow advances to step S9. In this case, the user designates a button number at which the registered current camera state is to be deleted.

In step S9, the system control circuit 30 checks whether predetermined camera state data i.e., an image sensing direction (pan and tilt angles) and a image sensing magnification (zoom value), have already been registered at the button selected in step S8. If YES in step S9, the flow advances to step S10. If NO in step S9, the flow returns to step S12.

In step S10, the system control circuit 30 deletes the image sensing direction and image sensing magnification registered at the button selected in step S8 from the memory 33.

In step S11, the system control circuit 30 deletes the button number displayed in the image sensable range 56 corresponding to the button selected in step S8. The flow then returns to step S12 to repeat the above processing.

Assume that the user selects one of the preset memory buttons 60, and a camera to be operated is controlled on the basis of the image sensing direction and image sensing magnification registered at the selected button. A procedure for this control will be described below with reference to the flow chart in FIG. 6.

Figure 5:
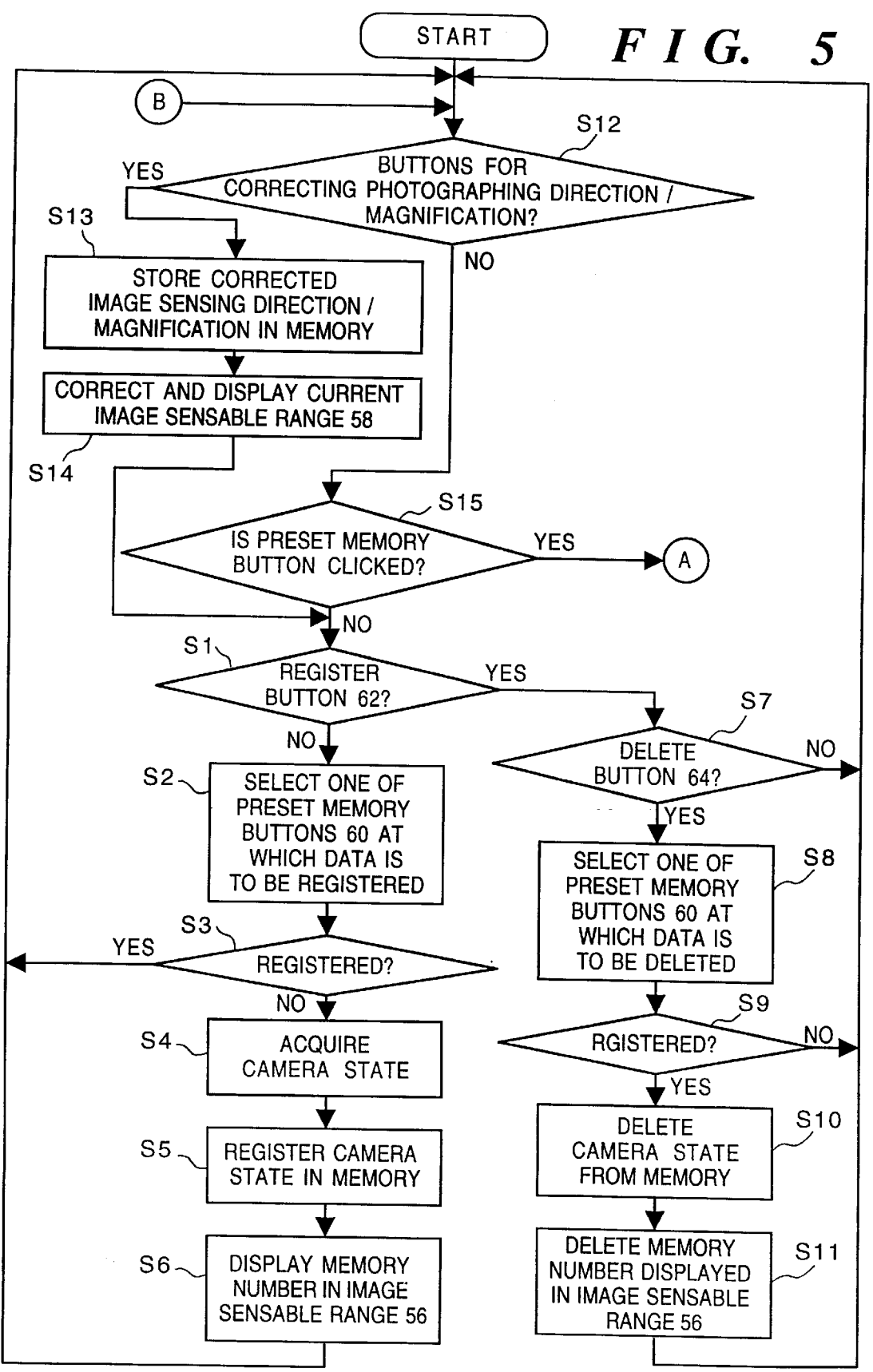
FIG. 5 is a flow chart showing a procedure for deleting data registered with preset memory buttons 60.

The processing in FIG. 6 is started when the system control circuit 30 determines in step S15 in FIG. 5 that one of the preset memory buttons 60 is selected.

Note that the number of the clicked button detected in step S15 is stored in the memory 33.

In step S21, the system control circuit 30 reads out the image sensing direction (pan and titling angles) and image sensing magnification (zoom value) corresponding to the clicked button detected in step S15 from the memory 33.

In step S22, the system control circuit 30 checks whether the readout values are predetermined data values indicating non-registration. If YES in step S22, the flow returns to step S12 (FIG. 5). If NO in step S22, the flow advances to step S23.

In step S23, the system control circuit 30 reads out the image sensing direction (pan and titling angles) and image sensing magnification (zoom value) corresponding to the clicked button detected in step S15 from the memory 33 again.

In step S24, the system control circuit 30 outputs the image sensing direction (pan and tilt angles) and the image sensing magnification (zoom value) and a predetermined camera control command to the camera control circuit 22 to change the current camera state to the state corresponding to the readout image sensing direction (pan and tilt angles) and image sensing magnification (zoom value). Upon reception of the command, the camera control circuit 22 drives a motor (not shown) for controlling panning, tilting, and zooming of the camera 20 to control the camera state to coincide with the input image sensing direction (pan and tilt angles) and image sensing magnification (zoom value). The current values of the camera 20 are stored in the memory area corresponding to the preset number 7.

The flow then returns to step S12.

With the above procedure, the camera can be easily controlled on the basis of setting/deletion of each camera state at a corresponding button, and selected buttons.

As has been described above, according to this embodiment, the camera can be controlled to a preset desired camera state by a single operation. In addition, since a graphic pattern represents a preset camera state, especially a specific image sensing direction within an image sensable range, the user can clearly recognize specific preset contents to be selected at a glance. With these effects, a considerable improvement in operability can be attained.

The present invention can be applied to a system constituted by a plurality of devices or to an apparatus comprising a single device.

Further, the object of the present invention can also be achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium, realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used to provide the program codes.

In addition to the aforesaid functions according to the above embodiments which are realized by executing the program codes and read by a computer, the present invention accommodates the case where an OS (operating system) or the like working on the computer, performs a part or entire processes in accordance with designations of the program codes and realizes functions according to the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. A camera control apparatus, comprising:

control means for controlling a field of view of a camera by changing a sensing direction of the camera;

first display means for displaying a viewable range which is defined by limits of panning and tilting and which exceeds a current imaging range of said camera, on a predetermined screen;

designation means for designating a desired sensing direction of said camera;

storage means for storing image sensing direction data of said camera designated by said designation means; and second display means for displaying identification data used to identify the image sensing direction data of said camera at a position corresponding to the image sensing direction data of said camera, which is stored in said storage means, within said viewable range displayed by said first display means.

2. The apparatus according to claim 1, wherein said storage means stores a plurality of image sensing direction data of said camera.

3. The apparatus according to claim 2, further comprising selection means for selecting one of the plurality of image sensing direction data of said camera, which are stored in said storage means, and wherein said second display means displays identification data used to identify the image sensing direction data selected by said selection means at a position corresponding to the image sensing direction data selected by said selection means within said viewable range displayed by said first display means.

4. The apparatus according to claim 1, further comprising deletion means for deleting the image sensing data of said camera which is stored in said storage means.

5. The apparatus according to claim 1, wherein said storage means further stores image sensing magnification data corresponding to the image sensing direction data of said camera.

6. The apparatus according to claim 5, further comprising third display means for displaying an image sensing frame corresponding to the image sensing magnification data stored in said storage means within said viewable range of said camera which is displayed by said first display means.

7. The apparatus according to claim 1, wherein said control means drives a predetermined camera in accordance with image sensing direction data of a camera which is stored in said storage means.

8. The apparatus according to claim 3, wherein said control means drives a predetermined camera in accordance with image sensing direction data selected by said selection means.

9. The apparatus according to claim 1, wherein the image sensing direction data of said camera includes pan and tilt angles.

10. The apparatus according to claim 7, wherein said camera control apparatus disclosed in claim 1 is connected to a predetermined data network, and said predetermined camera is a camera connected to the data network.

11. The apparatus according to claim 1, wherein said viewable range is determined by right/left and up/down delimiter of said camera for specific zoom setting.

12. A camera control method, comprising:

control step of controlling a field of view of a camera by changing a sensing direction of the camera;

first display step of displaying a viewable range which is defined by limits of panning and tilting and which exceeds a current imaging range of said camera, on a predetermined screen;

designating step of designating a desired image sensing direction of said camera;

storage step of storing image sensing direction data of said camera designated at said designating step; and second display step of displaying identification data used to identify the image sensing direction data of said camera at a position corresponding to the image sensing direction data of said camera, which is stored at said storage step, within said viewable range displayed at said first display step.

13. The method according to claim 12, wherein at said storage step a plurality of image sensing direction data of said camera is stored.

14. The method according to claim 13, further comprising selecting step of selecting one of the plurality of image sensing direction data of said camera, which are stored at said storage step, and wherein at said second display step, displaying identification data used to identify the image sensing direction data selected at said selection step at a position corresponding to the image sensing direction data selected at said selection step within said viewable range displayed at said first display step, is processed.

15. The method according to claim 12, further comprising deletion step of deleting the image sensing data of said camera which is stored at said storage step.

16. The method according to claim 12, wherein at said storage step further storing image sensing magnification data corresponding to the image sensing direction data of said camera is processed.

17. The method according to claim 16, further comprising third display step of displaying an image sensing frame corresponding to the image sensing magnification data stored at said storage step within said viewable range of said camera which is displayed at said first display step.

18. The method according to claim 12, wherein said control step drives a predetermined camera in accordance with image sensing direction data of a camera which is stored at said storage step.

19. The method according to claim 14, wherein said control step drives a predetermined camera in accordance with image sensing direction data selected at said selection step.

20. The method according to claim 12, wherein the image sensing direction data of said camera includes pan and tilt angles.

21. The method according to claim 18, wherein a camera control apparatus using the method disclosed in claim 11 is connected to a predetermined data network, and said predetermined camera is a camera connected to the data network.

22. The method according to claim 12, wherein said viewable range is determined by right/left and up/down delimiter for specific zoom setting.

* * * * *